(12) United States Patent
Gabriël (10) Patent No.: US 9,353,898 B2
(45) Date of Patent: May 31, 2016

(54) METHOD TUBULAR ELEMENT OF A FALL PIPE, FALL PIPE ASSEMBLED FROM SUCH ELEMENTS, COUPLING BETWEEN TWO SUCH TUBULAR ELEMENTS AND METHOD FOR ASSEMBLING THE FALL PIPE

(75) Inventor: Jan Gabriël, Mollem (BE)

(73) Assignee: Tideway B.V., Breda (NL)

( * ) Notice: Subject to any disclaimer, the term of this patent is extended or adjusted under 35 U.S.C. 154(b) by 784 days.

(21) Appl. No.: 13/378,611

(22) PCT Filed: Jun. 11, 2010

(86) PCT No.: PCT/NL2010/050361
§ 371 (c)(1),
(2), (4) Date: Jul. 5, 2012

(87) PCT Pub. No.: WO2010/147460
PCT Pub. Date: Dec. 23, 2010

(65) Prior Publication Data
US 2012/0267214 A1    Oct. 25, 2012

(30) Foreign Application Priority Data

Jun. 15, 2009    (NL) ..................................... 2003026

(51) Int. Cl.
*F16L 37/244*    (2006.01)

(52) U.S. Cl.
CPC ........ *F16L 37/2445* (2013.01); *Y10T 29/49826* (2015.01)

(58) Field of Classification Search
USPC ......... 285/282, 330, 360, 362, 376–377, 401, 285/913, 34, 391
See application file for complete search history.

(56) References Cited

U.S. PATENT DOCUMENTS

| | | | |
|---|---|---|---|
| 3,189,372 A * | 6/1965 | Johnson | ........................... 285/91 |
| 3,442,536 A | 5/1969 | Fowler | |
| 3,922,009 A | 11/1975 | Giebeler | |
| 3,948,545 A | 4/1976 | Bonds | |
| 4,209,191 A | 6/1980 | Lawson | |
| 4,613,164 A * | 9/1986 | Hughes et al. | ................... 285/27 |
| 6,106,024 A | 8/2000 | Herman | |
| 7,513,537 B2 * | 4/2009 | Mosing et al. | ................. 285/401 |

(Continued)

FOREIGN PATENT DOCUMENTS

EP    0668211    8/1995

OTHER PUBLICATIONS

International Preliminary Report on Patentability mailed on Sep. 12, 2011 in PCT Application No. PCT/NL2010/050361. (25 pages).

(Continued)

*Primary Examiner* — Aaron Dunwoody
*Assistant Examiner* — Fannie Kee (57) ABSTRACT

A tubular element of a fall pipe used for the purpose of depositing materials underwater from a fall pipe vessel. The fall pipe element comprises a male and a female coupling part for coupling to another element of the same form. The coupling parts are provided on respectively an outer periphery and inner periphery thereof with an annular flange which is divided in a peripheral direction into segments which leave recesses clear therebetween. For coupling purposes, segments of a male coupling part are placed through recesses of a female coupling part and slid by rotation under segments of the female coupling part. A fall pipe and a method for assembly thereof.

14 Claims, 9 Drawing Sheets

(56) References Cited

U.S. PATENT DOCUMENTS

2005/0087985 A1 4/2005 Mosing et al.
2008/0111376 A1* 5/2008 Ferrero ................... 285/376

OTHER PUBLICATIONS

International Search Report and Written Opinion mailed on Jul. 27, 2010 in PCT Application No. PCT/NL2010/050361. (9 pages).

* cited by examiner

METHOD TUBULAR ELEMENT OF A FALL PIPE, FALL PIPE ASSEMBLED FROM SUCH ELEMENTS, COUPLING BETWEEN TWO SUCH TUBULAR ELEMENTS AND METHOD FOR ASSEMBLING THE FALL PIPE

CROSS-REFERENCE TO RELATED APPLICATIONS

This application is a §371 national stage entry of International Application No. PCT/EP2010/050361 filed Jun. 11, 2010, which claims priority from NL, 2003026 filed Jun. 15, 2009, both of which are hereby incorporated by reference in their entirety, for all purposes herein.

FIELD OF THE INVENTION

The invention relates to a tubular element of a fall pipe used for the purpose of depositing materials, in particular rocks, on an underwater bottom. The invention also relates to a fall pipe assembled from such elements, a coupling between two such elements and to a method for assembling the fall pipe.

It is known to equip ships with provisions for assembling and carrying a fall pipe for the purpose of depositing materials, in particular rocks, on an underwater bottom. High standards are set for such a fall pipe. It must for instance be possible to easily store a good fall pipe on board the ship, and to assemble and disassemble it quickly. A suitable fall pipe is also sufficiently strong mechanically to be able to take up the high loads acting thereon. The fall pipe must be sufficiently stiff, particularly in axial direction, although a certain flexibility is advantageous to enable displacement of the bottom end of the fall pipe in the horizontal plane with a relatively limited force. In addition, the fall pipe must be able to deposit a large quantity of material per unit of time and be sufficiently watertight.

The known fall pipe, such as the fall pipe known from EP-A-0668211, is usually assembled from a series of mutually coupled or stacked tubular elements which is supported by cables attached to the lowest element. Each element therefore supports on the underlying element. The load which results from the dead weight of the fall pipe and from external loads such as caused by for instance current, by resonance and the like and which can be taken up by the cables is limited. The known fall pipe can hereby only be employed for relatively limited water depths. The assembly of the known fall pipe also takes a great deal of time, and the assembly requires human operations, whereby experience is important.

BACKGROUND OF THE INVENTION

U.S. Pat. No. 4,209,191 describes a tubular element for a riser pipe of an oil well. The elements are mutually coupled to form a pipe string, in particular a riser pipe string for underwater oil wells. The disclosed tubular elements comprise a male and a female coupling part for coupling to another element of the same form, which coupling parts are provided on respectively an outer periphery and inner periphery thereof with interlocking lugs. The lugs are provided in two series that are spaced apart in the axial direction of the element. The lugs in each series are aligned in the axial direction with corresponding lugs in the other series. U.S. Pat. No. 3,442, 536A, US 2005/087985A1, U.S. Pat. Nos. 3,948,545A, 3,922,009A and 6,106,024A describe similar tubular elements.

An object of the present invention is to provide a tubular element, using which a fall pipe can be assembled which can be employed for relatively great water depths and which can be assembled more easily than the known fall pipe.

This object is achieved according to various embodiments by providing a tubular element. The element comprises a male and a female coupling part for coupling to another element of the same form, which coupling parts are provided on respectively an outer periphery and inner periphery thereof with an annular flange which is divided in peripheral direction into segments which leave recesses clear therebetween, wherein for coupling purposes segments of a male coupling part are placed through recesses of a female coupling part and are slid by rotation under segments of the female coupling part. By mutual coupling of a plurality of elements according to the invention a fall pipe is obtained which requires no cables to support the fall pipe. Each fall pipe element hangs were from the element above it, whereby a self-supporting fall pipe is obtained. For the same length the fall pipe according to the invention can hereby be given a lighter form, and in particular a stiffer form in axial direction, than the known fall pipe. A greater axial stiffness results in a higher natural frequency for axial stress waves, whereby resonance in the fall pipe caused by movements of the ship will occur less, or even not at all.

The assembly of the fall pipe according to the invention can hereby take place in highly motorized and automatic manner, whereby great lengths can be made and/or raised at a relatively high assembly or disassembly speed. Because the coupling of the elements of the fall pipe can have a greater load-bearing surface compared to the known fall pipe, a stronger fall pipe is provided which is therefore particularly suitable for greater water depths.

According to the invention, a tubular element is provided wherein the coupling parts are provided with at least two annular flanges which lie at a mutual axial distance and which are divided in peripheral direction into segments leaving recesses clear therebetween, whereby the segments of an upper annular flange are arranged offset relative to the segments of a lower annular flange. Because the present embodiment comprises at least two annular flanges, the load-bearing surface of the coupling is further increased, this further increasing the axial load-bearing capacity and therefore increasing the potential length of the self-supporting fall pipe. The allowable bending moment in the fall pipe also increases considerably.

The tubular element according to the invention is particularly suitable for assembling a fall pipe. The invention also provides a method for assembling such a fall pipe. The method according to the invention comprises of providing a plurality of tubular elements according to the invention, placing segments of a male coupling part of a first element through recesses of a female coupling part of a second element, and rotating the first element relative to the second element, this in a manner such that the segments of the male coupling part are slid under segments of the female coupling part. Because no additional coupling means, such as for instance cables, are required, a fall pipe is assembled in simple manner and within a shorter time than the known fall pipe. This is all the more advantageous since the fall pipe according to the invention is particularly suitable for application at greater water depths. Such an application requires the coupling of a large number of elements.

In the method for assembling a fall pipe according to the invention, the coupling parts are provided with at least two annular flanges which lie at a mutual axial distance and which are divided in peripheral direction into segments which leave recesses clear therebetween, and segments of a male coupling part of a first element are placed through recesses of a female coupling part of a second element, whereafter the first element is rotated relative to the second element, this in a manner such that the segments of the male coupling part are slid under segments of the female coupling part, and this rotation is repeated at least twice.

In the fall pipe according to the invention the segments of a coupling part lying at a mutual axial distance extend at a mutual distance. The load-bearing surface, and thereby the strength of the coupling of the elements, is hereby further increased.

The above described embodiment allows the coupling and uncoupling of the fall pipe elements to proceed in highly motorized and automatic manner, this enabling a high sustained assembly and disassembly speed of the fall pipe. In order to (un)couple the elements the fall pipe vessel is preferably provided with a device comprising at least a clamping device for a fall pipe, in which clamping device an element can be temporarily suspended. The clamping device is moreover rotatable around the axial axis of an element suspended therein, for instance by being provided with a turntable. In order to couple an element to an already partially assembled fall pipe, the element is suspended from its upper end in the clamping device and lowered in controlled manner. The lower end of the element is coupled into the upper end of the already partially assembled fall pipe by placing segments of a male coupling part of the element through recesses of a female coupling part of the uppermost element of the already partially assembled fall pipe (or vice versa), and rotating the element relative to the already partially assembled fall pipe, this in a manner such that the segments of the male coupling part are slid under segments of the female coupling part (or vice versa). The tubular element for coupling can be rotated at the top around the axis in the suspension by means of the turntable in the suspension. The clamping device is preferably also provided with a control system, with which the mass of the tubular element can be compensated so that either a light pulling force (uncoupling) or a light pressing force (coupling) can be exerted on the preceding tubular element by the element for coupling.

The extent to which the segments extend over the periphery of the annular flange or annular flanges can be varied within broad limits. The segments of an annular flange preferably extend over more than 25% of the periphery of the element, more preferably over more than 35% and most preferably over substantially 50% of the periphery of the element.

In a practical embodiment each annular flange comprises four segments distributed regularly in peripheral direction. This results in a good compromise between a good locking and user-friendliness during assembly of the fall pipe.

The segments can have a varying form. The segments preferably comprise rounded portions, whereby the coupling of elements is further simplified. Rounded portions are also understood to mean chamfered portions.

In an advantageous embodiment the segments are positioned and/or formed such that mutually coupled elements can move relative to each other. Assembly of the fall pipe hereby proceeds more easily, since small relative movements of the two tubular parts for (un)coupling (fall pipe and part for (un)coupling) are then possible. The loads possibly occurring during use of the fall pipe, for instance as a result of currents, impacts and the assembly of the fall pipe, are hereby at least partially absorbed. A certain flexibility of the fall pipe (in the XZ and YZ plane) moreover has advantages. The Z-direction corresponds here to the axial direction of the fall pipe, while the (X,Y)-plane extends perpendicularly of the Z-direction.

The coupling parts and/or the annular flanges can be manufactured from various materials. The coupling parts and/or the annular flanges are preferably manufactured substantially from a steel alloy, an aluminium alloy and/or a fibre-reinforced plastic. These materials combine an adequate strength and processability with a low weight. The use of materials with a high strength/mass ratio is particularly appropriate when working at great depths, so that the load on the installation from which the fall pipe is hanging is not allowed to become unnecessarily great. This also applies for the power to be installed for the purpose of raising the fall pipe in a relatively short period of time.

Fibre-reinforced plastics comprise reinforcing fibres incorporated in a matrix of a plastic. The matrix of the fibre-reinforced plastic can comprise a thermoplast or a thermoset. The reinforcing fibres preferably comprise glass fibres and/or carbon fibres. In a preferred embodiment the fibre-reinforced plastic comprises carbon fibres in an epoxy matrix. Such a fibre-reinforced plastic combines an adequate strength with a low weight.

A particularly suitable aluminium alloy is the 1980 T1 alloy. Such an alloy is not only found to possess a strength such that a fall pipe of relatively great length can be provided, but it also combines a good corrosion-resistance with a good processability and weldability.

A particularly suitable embodiment comprises a tubular element which is manufactured by means of an extrusion process and thereby has very high and uniform mechanical characteristics, particularly in the axial direction, and wherein the male and female coupling parts are manufactured from forgings, whereby they have reliable mechanical characteristics.

The coupling parts can be connected in various ways to an element. It is thus possible to connect at least a coupling part integrally to the element, for instance by integral casting thereof with the element. A simple and strong element is hereby provided, wherein no additional connecting means are required. It has however been found advantageous to embody the coupling part separately and connect it to the element by making use of so-called friction stir welding. An accurate and strong connection of the coupling part to the element is obtained by making use of friction stir welding. It has been found that the strength of the material in the weld and in the zone affected by the welding heat is hardly less than that of the parent material.

Elements of the fall pipe may displace, in particular rotate, relative to each other due to for instance the depositing of material, currents and movements of the vessel or possible contact of the fall pipe with the bottom, whereby there can occur the risk of uncoupling of adjoining elements. In a further preferred embodiment the fall pipe according to the invention therefore comprises a locking or securing element for mutual locking of a male coupling part of an element and a female coupling part of an adjoining element. This reduces the risk of adjoining segments being able to displace relative to each other, particularly during use, and thereby possibly being uncoupled. The locking element particularly comprises a ring provided with projections which extend at a mutual distance and which can be placed between the segments of an annular flange. Such a locking element is simple and reliable. In a corresponding method for assembling a fall pipe the method is characterized by locking the first and the second element against relative rotation, and thereby against uncoupling, after mutual coupling of these elements.

In another preferred embodiment the above stated lock, or optionally another element, also provides for sealing on the outer side of the space between the female and the male coupling elements. Particles floating in the sea could after all settle in this space and thereby jam the coupling, or a water flow could occur from the sea through the coupling to the zone in the fall pipe, and this is not desirable.

The sealing element is preferably manufactured substantially from a flexible material such as a rubber or a polyolefin such as polyethylene. The sealing element is particularly embodied integrally with the locking element, which makes the fall pipe simple and inexpensive and also limits additional operations during assembly of the fall pipe.

In another preferred embodiment the tubular element comprises a sealing element for mutual liquid-tight coupling of two adjoining elements to the inner wall of the fall pipe. This improves the operation of the fall pipe. Possible feed of water into the fall pipe should preferably take place in controlled manner.

In a preferred embodiment the fall pipe is provided on the inner side with a wear lining which protects the load-bearing structure. This lining is preferably repairable and/or replaceable. A suitable material for the wear lining comprises polyurethane (PU).

In a further preferred embodiment use is made of the above stated wear lining to realize the above-mentioned seal on the inner wall of the fall pipe, for instance in the form of a labyrinth seal by finishing the lining at 45° on one side of the tubular element and at the corresponding angle of 45° at the other end, thereby creating an overlap and a simplified form of a labyrinth seal.

Although a fall pipe can be assembled of any desired length using the element according to the invention, the element is particularly suitable for assembling a fall pipe with a length of more than 1000 meters, more preferably of more than 1250 meters and most preferably of more than 1500 meters. Such heretofore unachievable lengths allow material to be deposited at great water depths, and this with sufficient precision.

SUMMARY OF THE INVENTION

The invention will now be elucidated in more detail with reference to the accompanying figures, without otherwise being limited thereto. In the figures.

DETAILED DESCRIPTION

Figure 1:
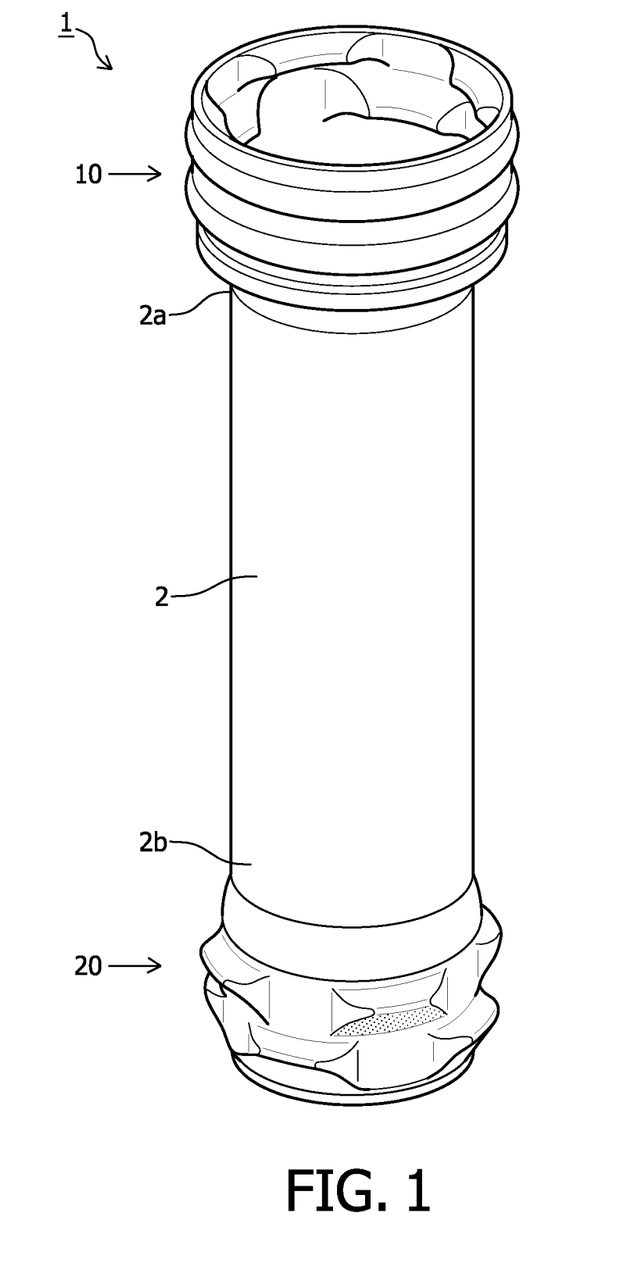
FIG. 1 is a perspective view of a tubular element according to the invention.

Referring to FIG. 1, a tubular element 1 according to the invention is shown. Tubular element 1 comprises tubular part 2 having at a first outer end 2a of tubular part 2 a female coupling part 10 and at a second outer end 2b of tubular part 2 a male coupling part 20. Both tubular part 2 and coupling parts (10, 20) are manufactured from an aluminium alloy. Coupling parts (10, 20) are connected concentrically to tubular part 2 by means of friction welds.

Figure 2A:
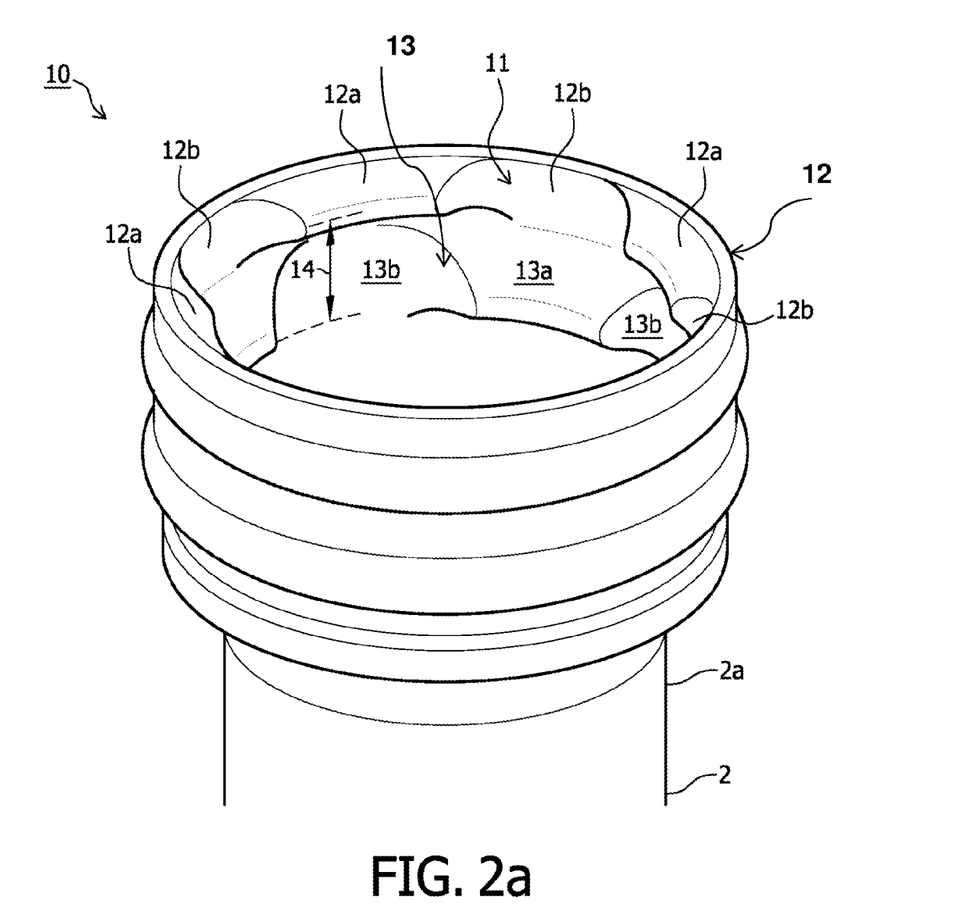
FIG. 2a is a perspective top view of a female coupling part of the element of FIG. 1.

Referring to FIG. 2a, a female coupling part 10 is shown of the tubular element 1 shown in FIG. 1. Female coupling part 10 is provided on an inner periphery 11 with two annular flanges (12, 13) lying at a mutual axial distance 14. Annular flanges (12, 13) are divided in the peripheral direction of female coupling part 10 into inward protruding segments (12a, 13a) which leave recesses (12b, 13b) clear therebetween. Segments 12a of upper annular flange 12 are arranged offset relative to segments 13a of lower annular flange 13. The same therefore applies for recesses 12b of upper annular flange 12 and recesses 13b of lower annular flange 13. The inward protruding segments (12a, 13a) are rounded.

Figure 2B:
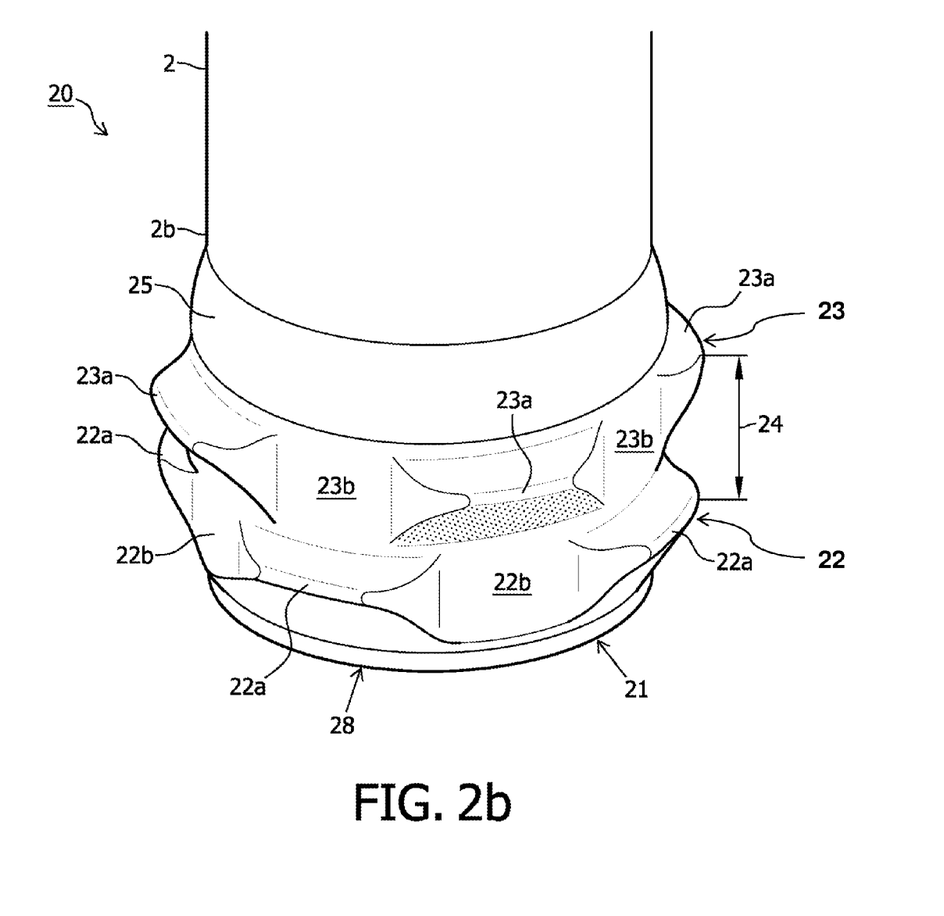
FIG. 2b is a perspective side view of a male coupling part of the element of FIG. 1.

Referring to FIG. 2b, a corresponding male coupling part 20 is shown of the tubular element 1 shown in FIG. 1. Male coupling part 20 is provided on an outer periphery 21 with two annular flanges (22, 23) lying at a mutual axial distance 24. Annular flanges (22, 23) are divided in the peripheral direction of annular coupling part 20 into outward protruding segments (22a, 23a) which leave recesses (22b, 23b) clear therebetween. Segments 22a of lower annular flange 22 are arranged offset relative to segments 23a of upper annular flange 23. The same therefore applies for recesses 22b of lower annular flange 22 and recesses 23b of upper annular flange 23. The outward protruding segments (22a, 23a) are rounded.

Figure 3A:
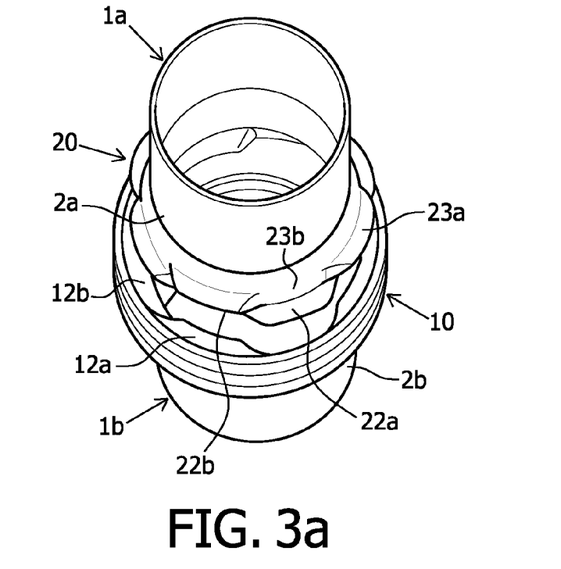
FIG. 3a is a perspective top view of two elements of FIG. 1 for coupling.
Figure 3B:
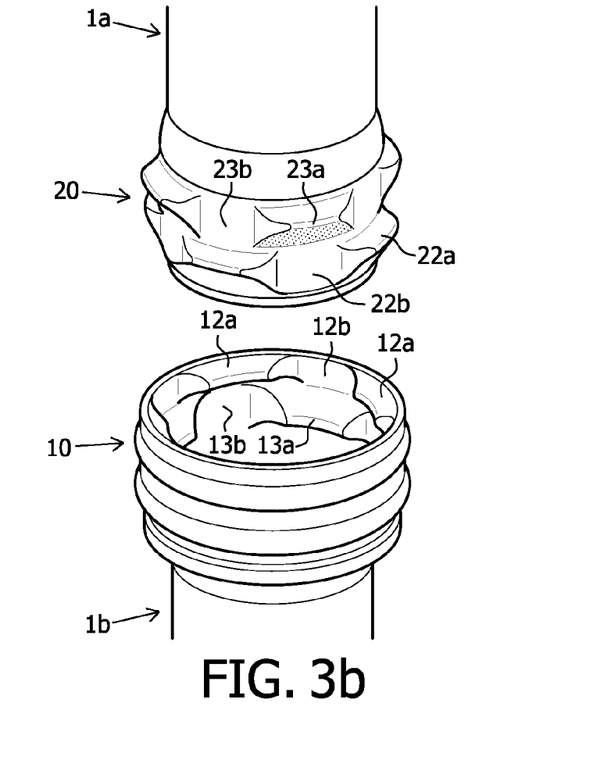
FIG. 3b is a perspective side view of two elements of FIG. 1 for coupling.

Referring to FIGS. 3a and 3b, two tubular elements 1a and 1b for coupling are shown extending in vertical direction. Tubular elements (1a, 1b) are here oriented such that female coupling part 10 of segment 1b extends in upward direction and male coupling part 20 of segment 1a extends in downward direction. This is the starting position for mutual coupling of tubular elements (1a, 1b) will be apparent that the relative position can also be reversed, wherein male coupling part 20 of element 1a extends in upward direction and female coupling part 20 of element 1b extends in downward direction.

FIGS. 5a-c and 6a-c show that in the coupled position a male coupling part 20 supports via a bottom edge 28 thereof on a stop 18 of a female coupling part 10.

Figures 4A, 4B:
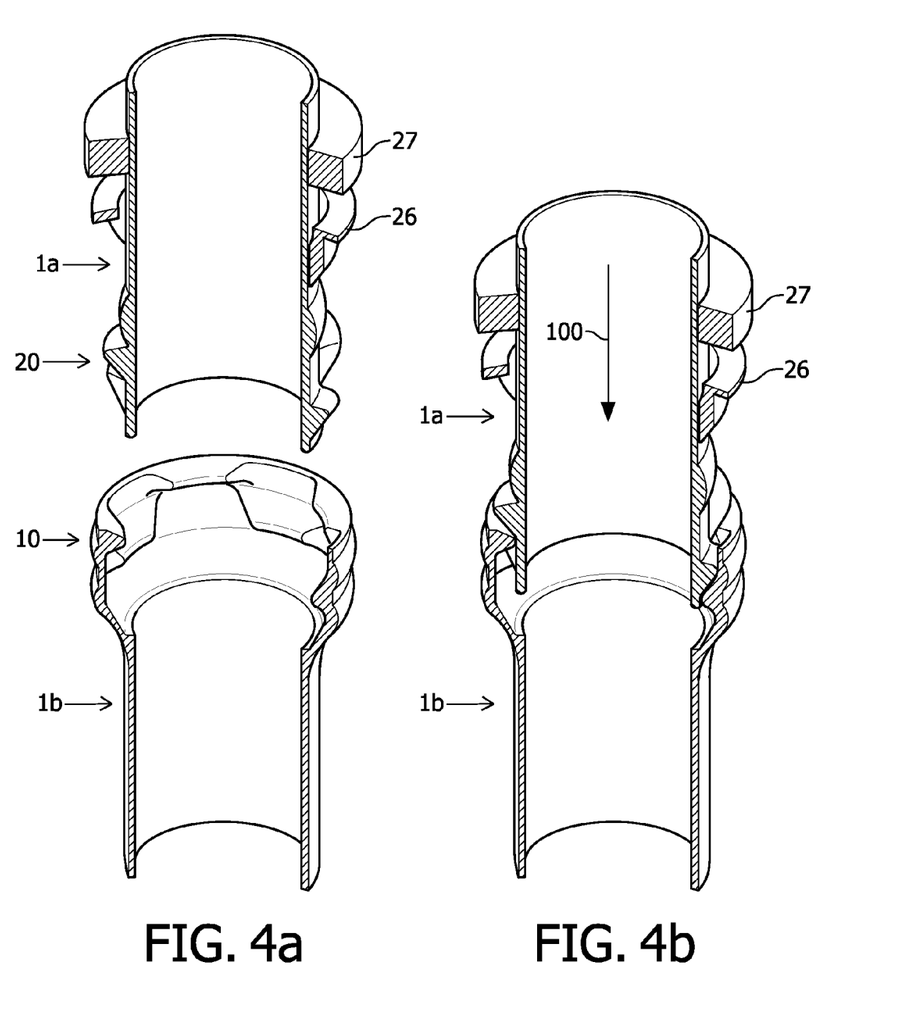
FIG. 4a-4f show the different stages during coupling of two elements of FIG. 1.
Figure 4C:
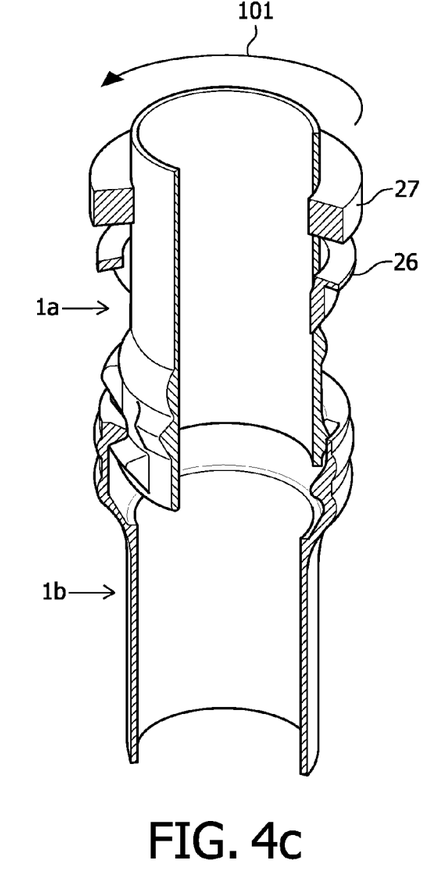
Figure 4D:
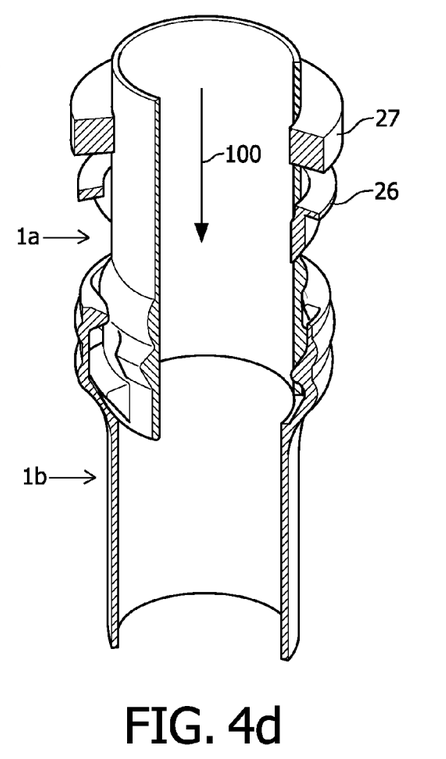
Figure 4E:
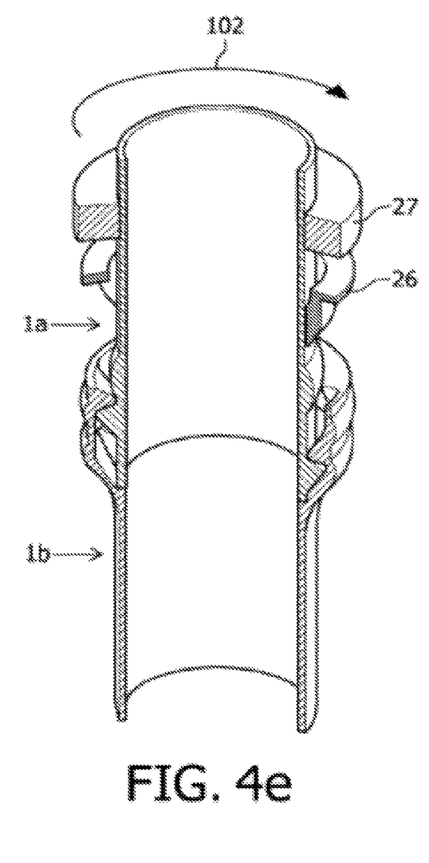
Figure 4F:
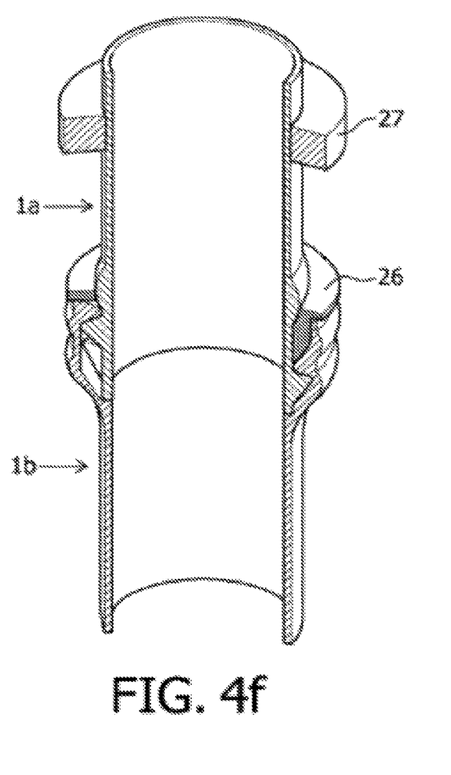
Figure 5A:
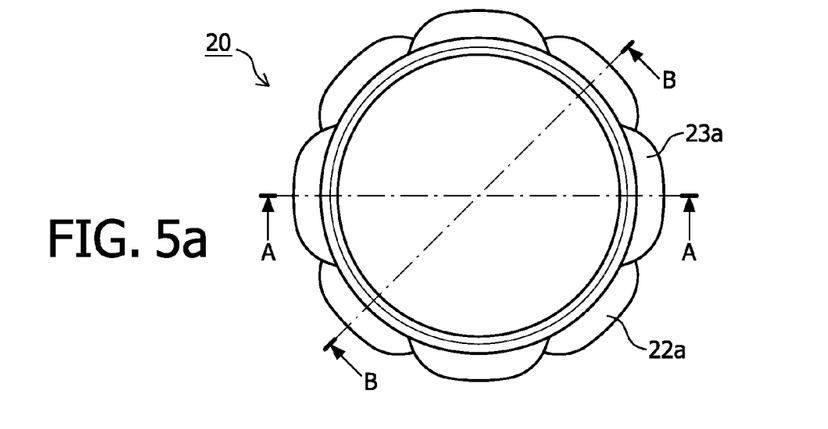
FIG. 5a-5c show respectively a top view, a view along section BB and a view along section AA of a male coupling element according to the invention, and finally
Figure 5B:
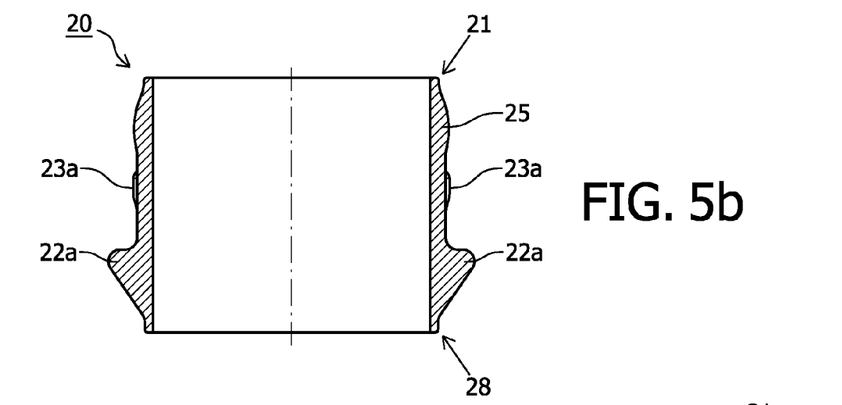
Figure 5C:
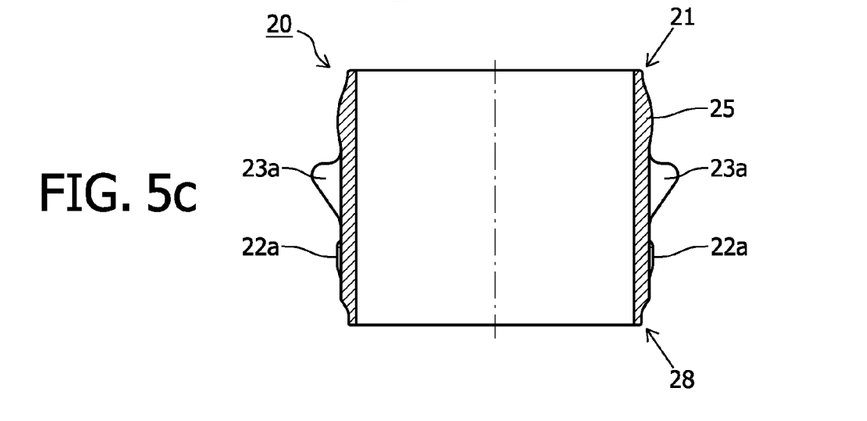
Figure 6A:
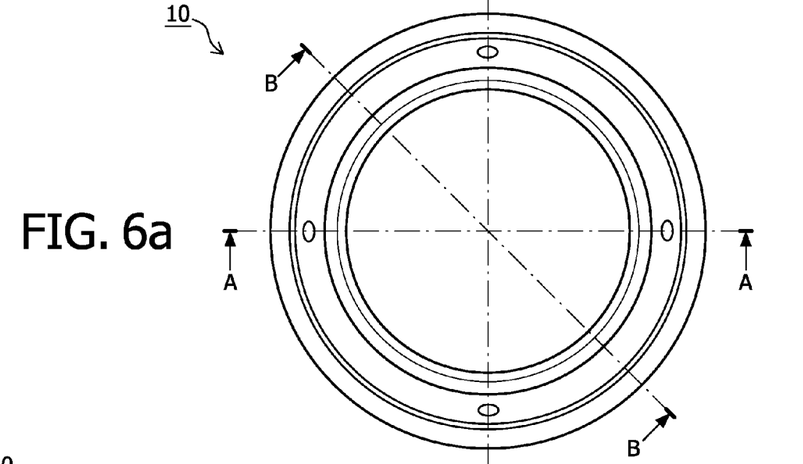
FIG. 6a-6c show respectively a top view, a view along section BB and a view along section AA of a female coupling element according to the invention.
Figure 6B:
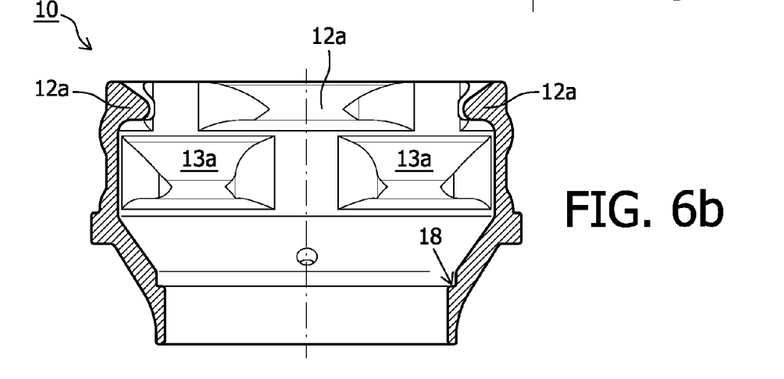
Figure 6C:
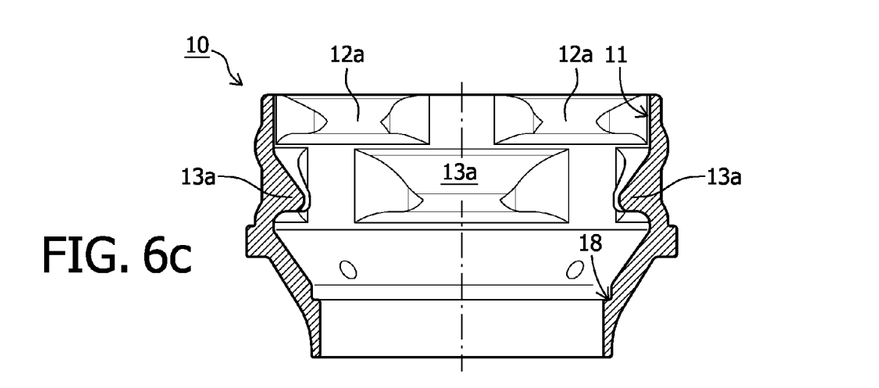

In order to couple tubular elements (1a, 1b), in a first step they are placed mutually in line as shown in FIG. 4a. The outward protruding segments 22a of lower annular flange 22 of male coupling part 20 here lie in line with the recesses 12b of upper annular flange 12 of female coupling part 10. Both elements (1a, 1b) are then moved toward each other in the indicated vertical direction 100, wherein the outward protruding segments 22a of upper annular flange 12 of male coupling part 20 are slid into the recesses 12b of upper annular flange 12 of female coupling part 10 (FIG. 4b) until they come into contact with the inward protruding segments 13a of lower annular flange 13 of female coupling part 10. Element 1a is subsequently rotated in the direction 101 relative to element 1b (FIG. 4c), wherein the outward protruding segments 22a of lower annular flange 22 of male coupling part 20 are slid through under the inward protruding segments 12a of upper annular flange 12 of female coupling part 10 into a position in which the outward protruding segments 23a of upper annular flange 23 of male coupling part 20 lie in line with the recesses 13b of lower annular flange 13 of female coupling part 10. From this position both elements (1a, 1b) are moved further toward each other in the indicated vertical direction 100 (FIG. 4d), wherein the outward protruding segments 23a of upper annular flange 22 of male coupling part 20 are slid into the recesses 13b of lower annular flange 13 of female coupling part 10 until the stop 25 of male coupling part 20 rests on the upper peripheral edge 11 of female coupling part 10. Referring to FIG. 4e, upper element 1a is rotated in the direction 102 relative to element 1b, wherein the outward protruding segments 23a of upper annular flange 22 of male coupling part 20 are slid through under the inward protruding segments 13a of lower annular flange 13 of female coupling part 10 into the coupled position. The element according to the invention is further optionally provided with a locking element in the form of a locking ring 26, which is provided with projections which extend at a mutual distance and which can be placed between the annular flanges of two coupling parts. Locking ring 26 is placed in order to complete the coupling between the annular flanges of two coupling parts, as shown in FIG. 4f. Finally, the element can, if desired, be equipped with a supporting ring 27, for instance of plastic, for the purpose of protecting the male element, for instance during horizontal storage. This supporting ring preferably has the same diameter as the largest diameter of the female element so that the tubular elements are stored horizontally and parallel to each other.

It will be apparent that the dimensions and geometry of the segments and the recesses are adapted to each other such that the above relative movements can be performed without appreciable disruption in the field. The invention is further not limited to the embodiments shown in the figures, and many variants thereof are possible within the scope of protection of the appended claims.

The invention claimed is:

1. A tubular element of a fall pipe used for the purpose of depositing materials underwater from a fall pipe vessel, the tubular element comprises a male and a female coupling part for coupling to another element of the same form, which coupling parts are provided on respectively an outer periphery and inner periphery thereof with at least two annular flanges extending in a peripheral direction of the element and disposed at an axial distance from each other, the flanges comprising a number of segments and interposed recesses, the segments of an upper annular flange being arranged offset relative to the segments of a lower annular flange, wherein for coupling purposes of a first element to a second element,
   a) segments of a male coupling part of the first element are brought in alignment with recesses of a female coupling part of the second element;
   b) said segments are furthered through said recesses by axially displacing the first element relative to the second element, and
   c) said segments are slid under segments of the female coupling part by rotation of the first element relative to the second element;
   wherein the steps a) to c) are carried out at least twice.

2. The element as claimed in claim 1, wherein each annular flange comprises four segments.

3. The element as claimed in claim 1, wherein the segments of an annular flange together extend over more than 25% of the periphery of the element.

4. The element as claimed in claim 3, wherein each annular flange comprises four segments.

5. The element as claimed in claim 1, wherein the segments comprise rounded portions.

6. The element as claimed in claim 1, wherein the segments are positioned or formed such that mutually coupled elements can move relative to each other.

7. The element as claimed in claim 1, wherein the coupling parts are manufactured substantially from a steel alloy, an aluminium alloy, a fibre-reinforced plastic, or any combination thereof.

8. The element as claimed in claim 1, wherein the coupling parts are manufactured substantially from an aluminium 1980 T1 alloy.

9. The element as claimed in claim 1, wherein at least one of the male or female coupling part is connected integrally to the element.

10. A fall pipe comprising a plurality of coupled elements, wherein each element comprises a male and a female coupling part for coupling to another element of the same form, which coupling parts are provided on respectively an outer periphery and an inner periphery thereof with at least two annular flanges extending in a peripheral direction of the element and disposed at an axial distance from each other, the flanges comprising a number of segments and interposed recesses, the segments of an upper annular flange being arranged offset relative to the segments of a lower annular flange, wherein for coupling purposes of a first element to a second element,
   a) segments of a male coupling part of the first element are brought in alignment with recesses of a female coupling part of the second element;
   b) said segments are furthered through said recesses by axially displacing the first element relative to the second element, and
   c) said segments are slid under segments of the female coupling part by rotation of the first element relative to the second element;
   wherein the steps a) to c) are carried out at least twice.

11. The fall pipe as claimed in claim 10, wherein the fall pipe has a length of more than 1000 metres.

12. The fall pipe as claimed in claim 10, wherein the fall pipe comprises a locking element for mutual locking of a male coupling part of an element and a female coupling part of an adjoining element.

13. A method for assembling a fall pipe providing a plurality of tubular elements, wherein each element comprises a male and a female coupling part for coupling to another element of the same form, which coupling parts are provided on respectively an outer periphery and an inner periphery thereof with at least two annular flanges extending in a peripheral direction of the element and disposed at an axial distance from each other, the flanges comprising a number of segments and interposed recesses, the segments of an upper annular flange being arranged offset relative to the segments of a lower annular flange, wherein for coupling purposes of a first element to a second element, the method comprising
   a) bringing segments of a male coupling part of the first element in alignment with recesses of a female coupling part of the second element;
   b) furthering said segments through said recesses by axially displacing the first element relative to the second element, and
   c) sliding said segments under segments of the female coupling part by rotation of the first element relative to the second element;
   wherein the steps a) to c) are carried out at least twice.

14. The method as claimed in claim 13, wherein the first and the second element are locked against relative rotation and displacement after mutual coupling of these elements.

* * * * *